(12) United States Patent
Takahashi (10) Patent No.: US 10,877,204 B2
(45) Date of Patent: Dec. 29, 2020

(54) ILLUMINATION DEVICE AND DISPLAY APPARATUS

(71) Applicant: SHARP KABUSHIKI KAISHA, Sakai (JP)

(72) Inventor: Nobuyuki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/624,878

(22) PCT Filed: Jun. 15, 2018

(86) PCT No.: PCT/JP2018/022878
§ 371 (c)(1),
(2) Date: Dec. 19, 2019

(87) PCT Pub. No.: WO2018/235732
PCT Pub. Date: Dec. 27, 2018

(65) Prior Publication Data
US 2020/0132918 A1    Apr. 30, 2020

(30) Foreign Application Priority Data

Jun. 22, 2017 (JP) ................................ 2017-122131

(51) Int. Cl.
*F21V 21/00* (2006.01)
*F21V 8/00* (2006.01)

(52) U.S. Cl.
CPC ......... *G02B 6/0068* (2013.01); *G02B 6/0021* (2013.01); *G02B 6/0055* (2013.01)

(58) Field of Classification Search
CPC ... G02B 6/0068; G02B 6/0021; G02B 6/0055
(Continued)

(56) References Cited

U.S. PATENT DOCUMENTS 4,714,983 A * 12/1987 Lang ................... G02B 6/0021
349/65
2003/0147257 A1    8/2003 Lee
(Continued)

FOREIGN PATENT DOCUMENTS

JP    2003-281917 A    10/2003

*Primary Examiner* — Laura K Tso
(74) *Attorney, Agent, or Firm* — ScienBiziP, P.C.

(57) ABSTRACT

An illumination device includes a light source row made up of multiple first light sources, each emitting light in the same direction and being aligned in a row with intervals maintained therebetween; a light guide member having a light-guide main portion in a plate shape including a light-incident surface which faces a first light-emitting portion and on which light from the first light-emitting portion is incident and a light-emitting surface from which light enters from the light-incident surface is externally emitted, and an extended portion in a plate shape thinner in thickness than the light-guide main portion and extending toward an outer side from part of the end surface of the light-guide main portion to cover the light source row from the front side; and multiple second light sources having a second light-emitting portion that emits light toward the extended portion and being disposed aligned in the row along with the light source row at both ends of the light source row to be covered by the extended portion.

6 Claims, 10 Drawing Sheets

(58) Field of Classification Search
USPC .................................. 362/621, 615, 613
See application file for complete search history.

(56) References Cited

U.S. PATENT DOCUMENTS

| | | | | |
|---|---|---|---|---|
| 2008/0225203 A1* | 9/2008 | Kim | ..................... | G02B 6/0031 349/65 |
| 2009/0091948 A1* | 4/2009 | Wang | ..................... | F21S 2/005 362/613 |
| 2009/0303744 A1* | 12/2009 | Iwasaki | ................ | G02B 6/0041 362/612 |
| 2012/0026751 A1* | 2/2012 | Lin | ..................... | G02B 6/0021 362/611 |
| 2017/0108633 A1* | 4/2017 | Zhu | ..................... | G02B 6/0021 |
| 2017/0192149 A1* | 7/2017 | Zhang | ................. | G02B 6/0021 |

* cited by examiner

ILLUMINATION DEVICE AND DISPLAY APPARATUS

TECHNICAL FIELD

The present invention relates to an illumination device and a display apparatus.

BACKGROUND ART

A liquid crystal display apparatus includes a liquid crystal panel and an illumination device (backlight device) that supplies light to the liquid crystal panel. As this type of illumination device, an edge-light (or side-light) illumination device is known in which multiple light emitting diodes (LEDs) are arranged so as to be aligned in a row in a manner facing an end surface of a light guide plate. Such an illumination device is disposed at a rear surface side of the liquid crystal panel and supplies light spreading in a planar manner toward the rear surface of the liquid crystal panel.

Luminance tends to be low around corner portions of the light guide plate in edge-light illumination devices using LEDs. This is because light emitted from LEDs has a predetermined spread angle (directionality), and accordingly if a corner portion of the light guide plate is placed at a dark portion outside of light that has spread, it is difficult for light to be supplied to the corner portion. Accordingly, an illumination device has been proposed in which light from LEDs is directly incident from corner portions of the light guide plate so as to suppress low luminance around the corner portions of the light guide plate, as described in PTL 1, for example. This illumination device has, in addition to an end surface along one side of the light guide plate, two oblique end surfaces that are disposed at respective ends of the end surface (e.g., corner portions of the light guide plate) and are oblique with respect to the end surface, to serve as light-incident surfaces where light from LEDs is incident. Accordingly, LEDs are disposed so as to face the oblique end surfaces at the corner portions of the light guide plate.

CITATION LIST

Patent Literature

PTL 1: Japanese Unexamined Patent Application Publication No. 2003-281917

Technical Problem

Portions where LEDs are disposed in the illumination device need to correspond to a non-display region disposed around a display region of the liquid crystal panel. Accordingly, disposing LEDs so as to face the corner portions of the light guide plate as described above increases the size of the portion corresponding to the non-display region. Particularly, if a display region having a rectangular shape is to be set, the width of the non-display region encompassing the display region becomes large, and a narrow picture-frame has not been able to be realized.

SUMMARY OF INVENTION

The present invention aims to provide an illumination device where narrowing of a portion corresponding to a non-display region of a display panel can be realized, and low luminance at ends of a light source row is suppressed.

Solution to Problem

An illumination device according to the present invention includes a light source row made up of multiple first light sources, each having a first light-emitting portion that emits light in the same direction and being aligned in a row with intervals maintained between the first light sources; a light guide member having a light-guide main portion in a plate shape including a light-incident surface which is an end surface facing the first light-emitting portion and on which light from the first light-emitting portion is incident and a light-emitting surface which is a plate surface on a front side and from which light entering the light-guide main portion from the light-incident surface is externally emitted, and having an extended portion in a plate shape which is thinner in thickness than the light-guide main portion and extends toward an outer side from part of the end surface of the light-guide main portion to cover the light source row from the front side; and multiple second light sources having a second light-emitting portion that emits light toward the extended portion and being disposed in the row along with the light source row at both ends of the light source row to be covered by the extended portion.

Advantageous Effects of Invention

According to the present invention, an illumination device can be provided where narrowing of a portion corresponding to a non-display region of a display panel can be realized, and low luminance at ends of a light source row is suppressed.

DESCRIPTION OF EMBODIMENTS

Embodiment 1

Figure 1:
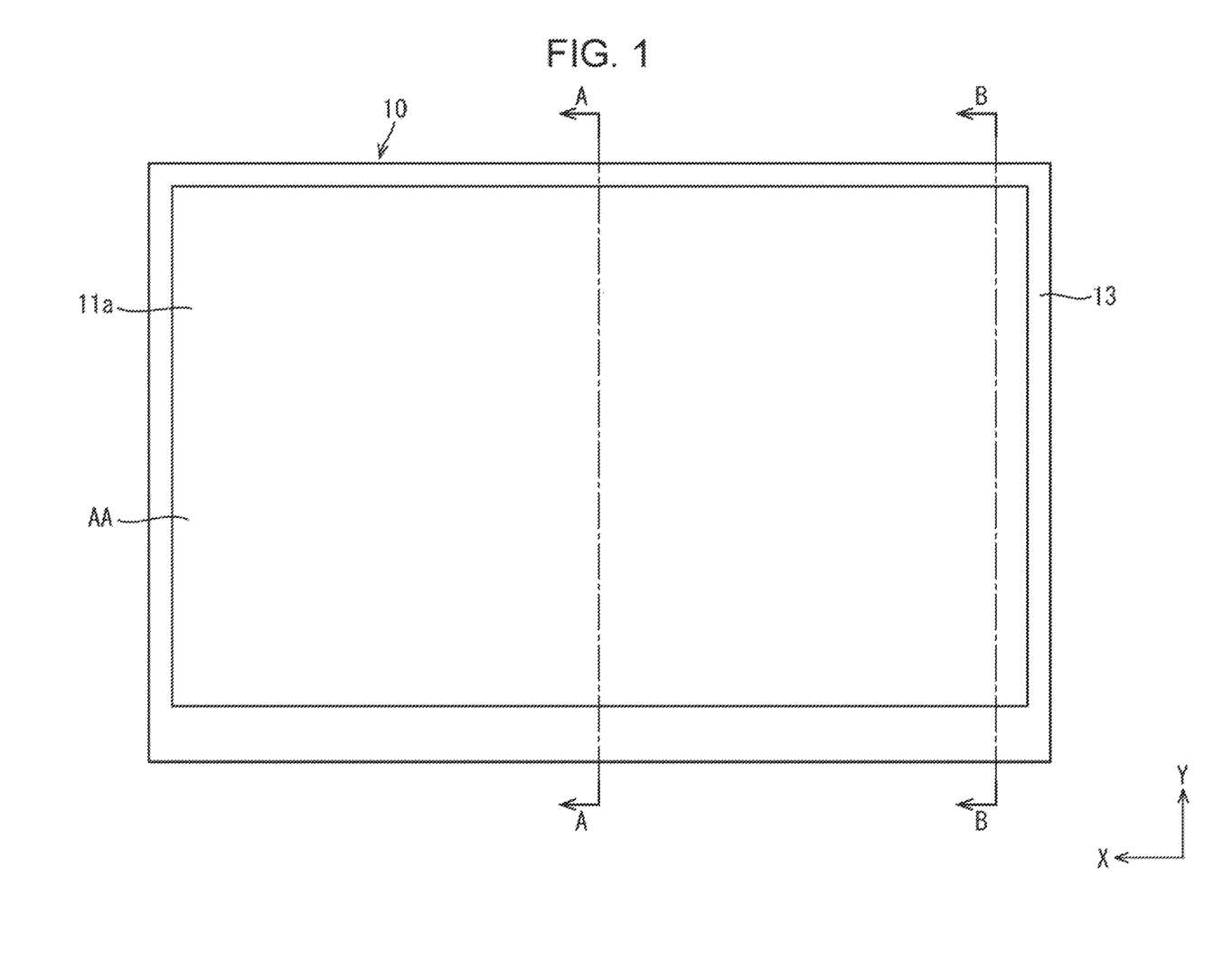
FIG. 1 is a plan view of a liquid crystal display apparatus according to Embodiment 1 of the present invention.
Figure 2:
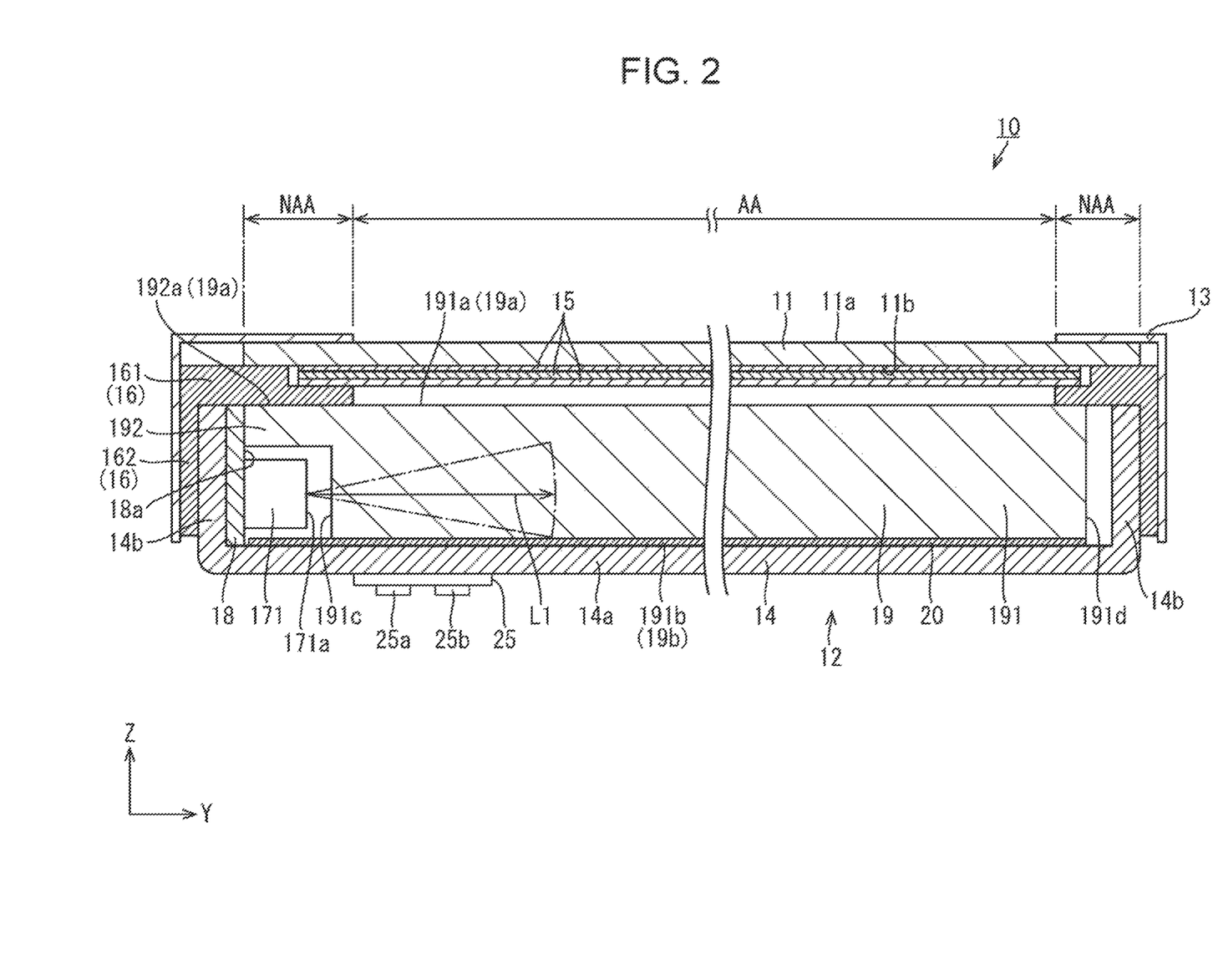
FIG. 2 is a sectional view of the liquid crystal display apparatus taken along line A-A in FIG. 1.
Figure 3:
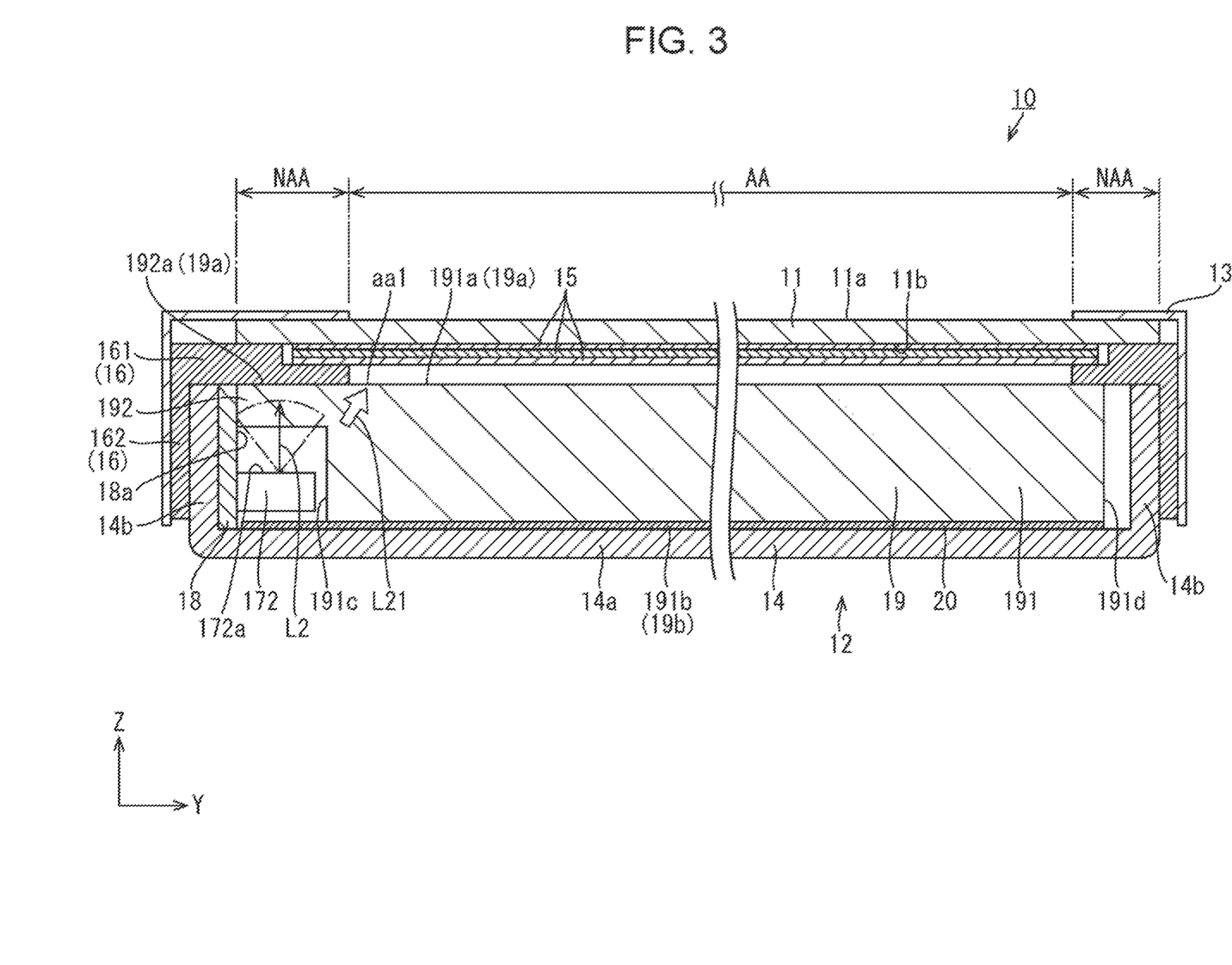
FIG. 3 is a sectional view of the liquid crystal display apparatus taken along line B-B in FIG. 1.
Figure 4:
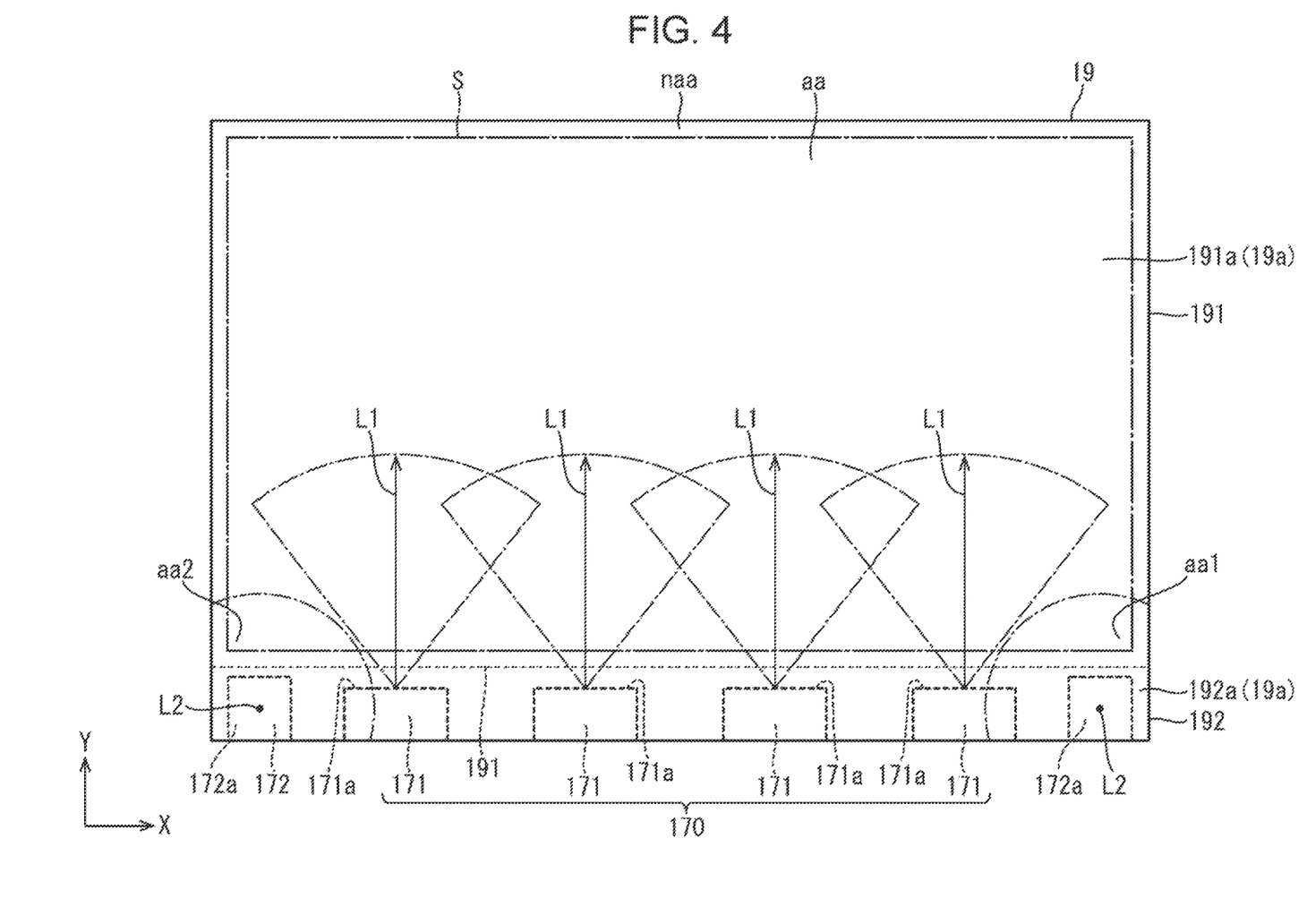
FIG. 4 is a plan view illustrating an arrangement relationship between a light guide member and LEDs (first LEDs and second LEDs) included in an illumination device according to Embodiment 1.

A liquid crystal display apparatus 10 including an illumination device 12 according to Embodiment 1 of the present invention will be described below with reference to FIG. 1 through FIG. 6. Note that the drawings have the X axis, Y axis, and Z axis illustrated for convenience of description. FIG. 1 is a plan view of the liquid crystal display apparatus 10 according to Embodiment 1 of the present invention, FIG. 2 is a sectional view of the liquid crystal display apparatus 10 taken along line A-A in FIG. 1, FIG. 3 is a sectional view of the liquid crystal display apparatus 10 taken along line B-B in FIG. 1, and FIG. 4 is a plan view illustrating an arrangement relationship between a light guide member and LEDs included in the illumination device 12 according to Embodiment 1. The liquid crystal display apparatus 10 has an overall laterally-long rectangular shape where the right-left direction (X axis direction) extends longer than the up-down direction (Y axis direction), as illustrated in FIG. 1.

The liquid crystal display apparatus 10 mainly includes, for example, a liquid crystal panel 11 usable as a display panel, an illumination device (backlight device) 12 serving as an external light source that supplies light to the liquid crystal panel 11, a bezel 13 in a frame shape that holds the liquid crystal panel 11, the illumination device 12, and the like.

The liquid crystal panel 11 is mainly made up of a pair of transparent substrates and a liquid crystal layer interposed and sealed between the transparent substrates, and displays images in a visually-recognizable manner on a display surface 11a by using light emitted from the illumination device 12. The liquid crystal panel 11 has an overall rectangular shape that is long in the lateral direction in plan view. One substrate of the pair of substrates making up the liquid crystal panel 11 is an array substrate where thin film transistors (TFTs) that are switching devices, pixel electrodes, and so forth, are arranged in a matrix on a transparent glass substrate. Also, the other substrate is a color filter (hereinafter, CF) substrate where color filters of the colors red, green, and blue are arranged in a matrix on a transparent glass substrate.

The liquid crystal panel 11 has a display region AA at the middle of the display surface 11a where images are displayed. The display region AA has a laterally-long rectangular shape in plan view with a non-display region NAA that has a frame shape (picture-frame shape) disposed on the periphery of the display surface 11a so as to encompass the display region AA.

The illumination device 12 is a device that is disposed on a rear surface 11b side of the liquid crystal panel 11 and supplies light toward the liquid crystal panel 11, and is configured to emit white light that spreads like a plane. The illumination device 12 is a kind of an edge-light (side-light) illumination device, and is mainly made up of a chassis 14, an optical sheet 15, a frame 16, first LEDs (first light sources) 171, second LEDs (second light sources) 172, an LED board 18, a light guide member 19, a reflecting sheet 20, and so forth, as illustrated in FIG. 2 through FIG. 4.

The chassis 14 in overall has substantially a box shape that is shallow and opens toward the front side, and is made up of a metal plate such as an aluminum plate, electrogalvanized steel plate (SECC), or the like, for example. The chassis 14 has a bottom portion 14a in a plate shape that has a substantially rectangular shape in plan view, in the same way as the liquid crystal panel 11 and so forth, and a side wall portion 14b in a plate shape that rises from the periphery of the bottom portion 14a and encompasses the bottom portion 14a.

Various members such as the LED board 18 to which the first LEDs 171 and second LEDs 172 are mounted, the reflecting sheet 20, the light guide member 19, the optical sheet 15, and so forth, are accommodated in the chassis 14. Note that boards such as a control board, LED drive board 25, and so forth, are attached outside of the chassis 14.

The reflecting sheet 20 is disposed within the chassis 14 so as to cover the front surface of the bottom portion 14a. The reflecting sheet 20 is a light-reflecting sheet-like member, and is made of, for example, white foamed polyethylene terephthalate (an example of a white plastic sheet) or the like. The light guide member 19 is accommodated within the chassis 14 on the reflecting sheet 20.

The light guide member 19 is made of a synthetic resin material (e.g., acrylic resin such as PMMA, polycarbonate resin, or the like) that has a refractive index sufficiently higher than air, is transparent, and has excellent optical transparency. The light guide member 19 overall is a member in substantially a plate shape that has a rectangular shape in plan view. In detail, the light guide member 19 includes a light-guide main portion 191 in a plate shape having a predetermined thickness that occupies the most part of the light guide member 19, and an extended portion 192 in a plate shape that is thinner in thickness than the light-guide main portion 191 and that is a portion extending at an end portion of the light-guide main portion 191. The extended portion 192 extends at the end portion on a long-edge side of the light-guide main portion 191. A plate surface 191a at the front side of the light-guide main portion 191 and a plate surface 192a at the front side of the extended portion 192 are continuous as a single plate surface. That is to say, the light guide member 19 is shaped such that an end portion corresponding to one side of the plate member has been notched out from the rear side. Note that in the present specification, a plate surface 19a on the front side of the light guide member 19 is made up of the plate surface 191a of the light-guide main portion 191 and the plate surface 192a of the extended portion 192, and a plate surface 19b on the rear side of the light guide member 19 is made up of a plate surface 191b on the rear side of the light-guide main portion 191 alone. The light guide member 19 thus configured is accommodated within the chassis 14 with the plate surface 19a at the front side facing the rear surface 11b side of the liquid crystal panel 11, and the rear-side plate surface 19b facing the reflecting sheet 20.

Of the plate surface 19a at the front side of the light guide member 19, the most part of the plate surface 191a of the light-guide main portion 191 overlaps the display region AA of the liquid crystal panel 11 in plan view. Note that the frame-like periphery of the plate surface 191a overlaps the non-display region NAA, albeit over a very narrow area. In contrast, the plate surface 192a of the extended portion 192 does not overlap the display region AA of the liquid crystal panel 11 in plan view, only overlapping the non-display region NAA. Accordingly, of the plate surface 19a at the front side of the light guide member 19, only the plate surface 191a at the front side of the light-guide main portion 191 is capable of serving as a light-emitting surface 191a that emits light toward the liquid crystal panel 11 side.

The optical sheet 15 is disposed, in a state of being placed on the frame 16, between the light-emitting surface 191a and the liquid crystal panel 11. Of the four end surfaces that the light-guide main portion 191 has, an end surface 191c at the portion where the extended portion 192 is provided faces the multiple first LEDs 171 aligned in a row and serves as a light-incident surface (first light-incident surface) 191c where light from the first LEDs 171 is incident. The light-incident surface (first light-incident surface) 191c faces first light-emitting portions 171a of the first LEDs 171. Note that an end surface 191d of the light-guide main portion 191 that is at the opposite side from the light-incident surface 191c faces the side wall portion 14b within the chassis 14.

A plate surface 192b on the rear side of the extended portion 192 faces light-emitting surfaces (second light-emitting portions) 172a of the second LEDs 172 and serves as a light-incident surface (second light-incident surface) 192b where light from the light-emitting surfaces (second light-emitting portions) 172a can be incident.

A light-reflecting/scattering pattern is formed on the plate surface 19b (plate surface 191b of the light-guide main portion 191) on the rear side of the light guide member 19. The light-reflecting/scattering pattern has a function of reflecting or scattering light entering the light guide member 19 from the light-incident surface 191c and light-incident surface 192b, so as to direct light toward the light-emitting surface 191a side. The light-reflecting/scattering pattern is configured of, for example, multiple white coating films printed as dots, or the like.

The frame 16 has an overall frame form (picture-frame form) that covers a peripheral edge portion of the light guide member 19 from the front side, and is assembled to the opening portion of the chassis 14 from the front side. The frame 16 is a molded article made of synthetic resin, for example. The frame 16 has a main frame portion 161 that has a frame form in plan view, with an inner rim side thereof being placed from the front side against the peripheral edge portion of the light guide member 19 in a state of being accommodated within the chassis 14, and an upright wall portion 162 that extends from the main frame portion 161 toward the bottom portion 14a side of the chassis 14 and that is disposed on the outer side of the side wall portion 14b of the chassis 14.

The main frame portion 161 has a frame form that has a predetermined width such that the inner rim side thereof overlaps the peripheral edge portion of the light guide member 19 and an outer rim side thereof overlaps an upper end portion of the side wall portion 14b of the chassis 14. The rear surface of the inner rim side of the main frame portion 161 is placed against the peripheral edge portion of the light guide member 19 from the front side. The frame-like periphery of the plate surface 191a of the light-guide main portion 191 and the plate surface 192a of the extended portion 192 are covered by the main frame portion 161 thus configured. The front surface of the main frame portion 161 at the inner rim side is designed to be recessed in comparison with the front surface of the outer rim side, and the edge portion of the optical sheet 15 is placed on the recessed portion.

The upright wall portion 162 has a plate shape that extends from the rear surface of the outer rim side of the main frame portion 161 toward the bottom portion 14a side of the chassis 14 and faces the outer peripheral surface of the side wall portion 14b of the chassis 14. Note that the upright wall portion 162 has an overall frame form that encompasses the side wall portion 14b.

The optical sheet 15 has a laterally-long substantially-rectangular shape in plan view like the liquid crystal panel 11 and so forth. The optical sheet 15 is disposed between the light-emitting surface 191a of the light guide member 19 and the rear surface 11b of the liquid crystal panel 11. The peripheral edge portion of the optical sheet 15 is placed on the main frame portion 161 of the frame 16 from the front side. The optical sheet 15 has a function of transmitting light emitted from the light guide member 19 to the liquid crystal panel 11 side, while imparting a predetermined optical effect thereto. The optical sheet 15 includes layered multiple sheets. Specific examples of sheets making up the optical sheet 15 include diffusing sheets, lens sheets, reflective polarizing sheets, and so forth. Note that the optical sheet 15 is made of a transparent plastic material.

The illumination device 12 is provided with two types of light sources to supply light to the light guide member 19. One type of light source (first light source) is the first LEDs 171 that emit light toward the light-incident surface (first light-incident surface) 191c of the light guide member 19, and the other type of light source (second light source) is the second LEDs 172 that emit light toward the plate surface (second light-incident surface) 192b on the rear side of the extended portion 192.

Multiple first LEDs 171 are aligned in a row (one row in the case of the present embodiment) and used while intervals (equal intervals in the case of the present embodiment) are maintained between each other such that each of the first LEDs 171 emits light in the same direction. The multiple first LEDs 171 thus aligned in a row make up a light source row 170, as illustrated in FIG. 4. In each of the first LEDs 171 making up the light source row 170, the light-emitting surface (first light-emitting portion) 171a faces in the same direction (e.g., the light-incident surface 191c side). The length of the light source row 170 is shorter than the elongated light-incident surface 191c extending in the right-left direction (X axis direction). The light source row 170 configured thus is arranged within the chassis 14 so as to face the middle side portion of the light-incident surface 191c. The first LEDs 171 are top-emitting LEDs, and are surface-mounted on the LED board 18 with the light-emitting surfaces (first light-emitting portions) 171a facing the opposite side from the LED board (light source board) 18 side. The first LEDs 171 are each made up of mainly an LED element (LED chip, light-emitting element) that is a light-emission source, a sealant (transparent resin material) that seals the LED element, and a case (container, housing) in which the LED element is accommodated and also filled with the sealant. The first LEDs 171 according to the present embodiment are each configured so as to emit white light. The direction of light having the highest light emission intensity, out of light emitted from the light-emitting surfaces 171a of the first LEDs 171, is illustrated as optical axis L1 in FIG. 2 and so forth. Light emitted from the first LEDs 171 has a predetermined spread angle, which is schematically depicted in a fan-like manner in FIG. 2 and FIG. 4. In the case of the present embodiment, intervals between adjacent first LEDs 171 are set so that part of light emitted from the light-emitting surfaces 171a (light having a predetermined spread angle, depicted in a fan-like manner in plan view) overlaps each other between the adjacent first LEDs 171. Thus, intervals between adjacent first LEDs 171 are set so that adjacent first LEDs 171 are close to each other, thereby preventing portions where luminance is low (dark portions) from being formed between adjacent first LEDs 171.

The second LEDs 172 are disposed at both ends of the light source row 170 so as to be aligned in a row along with the light source row 170 made up of the first LEDs 171. That is to say, one second LED 172 is disposed at one end of the light source row 170 and another one second LED 172 is disposed at another end of the light source row 170 with the light source row 170 positioned therebetween. The light-emitting surfaces (second light-emitting portions) 172a of the second LEDs 172 emit light toward the plate surface (second light-incident surface) 192b on the rear side of the extended portion 192. The second LEDs 172 are side-emitting LEDs, and are surface-mounted on the LED board 18 with the light-emitting surfaces (second light-emitting portions) 172a extending perpendicularly to the front surface (mounting surface) of the LED board 18. In the same way as with the first LEDs 171, the second LEDs 172 also are each made up of mainly an LED element (LED chip, light-emitting element) that is a light-emission source, a sealant (transparent resin material) that seals the LED element, and a case (container, housing) in which the LED element is accommodated and also filled with the sealant. The second LEDs 172 also are each configured so as to emit white light, in the same way as with the first LEDs 171. The direction of light having the highest light emission intensity, out of light emitted from the light-emitting surfaces 172a of the second LEDs 172, is illustrated as optical axis L2 in FIG. 3 and so forth. Light emitted from the second LEDs 172 has a predetermined spread angle, which is schematically depicted in a fan-like manner in FIG. 3 and FIG. 4. The optical axis L2 of the second LEDs 172 is directed in a direction perpendicular to the optical axis L1 of the first LEDs 171. Note that the second LEDs 172 is controlled to be driven and lit independently from the first LEDs 171 being driven and lit, which will be described later. The luminance of light emitted from the second LEDs 172 is set lower than the luminance of light of the first LEDs 171 in the case of the present embodiment.

The LED board (light source board) 18 has a thinly extending rectangular shape (strip-like form) and is disposed along the light-incident surface 191c on the long-edge side of the light guide member 19 (light-guide main portion 191). The LED board 18 is mounted, such that the first LEDs 171 and second LEDs 172 are aligned on the surface 18a of the LED board 18 in a row (one row) in the longitudinal direction. Note that the LED board 18 is attached to an inner wall surface of the side wall portion 14b so that the LED board 18 erects with respect to the bottom portion 14a of the chassis 14. Note that part of the surface 18a of the LED board 18 faces the end surface of the extended portion 192 of the light guide member 19.

The LED board 18 is made by forming, for example, a wiring pattern made of a metal film such as copper foil or the like on the surface of a plate member made of an aluminum material with an insulating layer interposed therebetween. Note that a white reflecting layer may be formed on the outermost surface of the LED board 18. The above-described multiple first LEDs 171 and second LEDs 172 are surface-mounted on the surface 18a of the LED board 18. The first LEDs 171 are electrically connected to the wiring pattern routed in the surface (mounting surface) 18a. Also, the second LEDs 172 are electrically connected to a wiring pattern that is different from the above wiring pattern so as to be controlled independently from the first LEDs 171.

Multiple first LEDs 171 and multiple second LEDs 172 are disposed on the LED board 18 to be aligned in a row (one row) while intervals being maintained between each other. The LED board 18 is provided with a connector portion to which a wiring member not illustrated is connected, and driving power is supplied from the LED drive board 25 via the wiring member.

The extended portion 192 of the light guide member 19 overhangs toward the outer side from part of the end surface 191c of the light-guide main portion 191 such that the extended portion 192 covers the first LEDs 171 (light source row 170) and second LEDs 172 from the front side, as illustrated in FIG. 2 through FIG. 4. The first LEDs 171 and second LEDs 172 are arranged in a space formed below the extended portion 192 overhanging, in a state of being mounted on the LED board 18 as described above. The second LEDs 172 are aligned in a row along with the light source row 170, in a state of being covered by the extended portion 192 from the front side.

The first LEDs 171 making up the light source row 170 emit light toward the light-incident surface 191c extending in the direction of long sides of the light-guide main portion 191, as illustrated in FIG. 4.

Note that of the plate surface 19a on the front side of the light guide member 19 in FIG. 4, the light-emitting surface 191a within a frame in a rectangular shape indicated by a dash-dotted line S is a region aa corresponding to the display region AA of the liquid crystal panel 11 (region overlapping the display region AA in plan view). Also, of the plate surface 19a on the front side of the light guide member 19, the portion outside the frame indicated by the dash-dotted line S (part of the light-emitting surface 191a, and the plate surface 192a on the front side of the extended portion 192) is a region naa corresponding to the non-display region NAA of the liquid crystal panel 11 (region overlapping the non-display region NAA in plan view). The first LEDs 171 and second LEDs 172 are disposed so as to overlap the region naa of the light guide member 19 corresponding to the non-display region NAA.

One second LED 172 is arranged at both ends of the light source row 170, that is, near both ends of the end portion of the rectangular light-guide main portion 191 in plan view in the direction of the long side including the light-incident surface 191c. That is to say, the second LEDs 172 are disposed near the corner portions of the light-guide main portion 191, outside of light that is emitted from adjacent first LEDs 171 and has a predetermined spread angle.

The second LEDs 172 supply light to corner portions (come portions near the light-incident surface 191c) aa1 and aa2 where the quantity of light tends to be insufficient with the first LEDs 171 alone within the region aa of the light guide member 19 (light-emitting surface 191a) corresponding to the display region AA. The light-emitting surfaces (second light-emitting portions) 172a of the second LEDs 172 face the plate surface 192b on the rear side of the extended portion 192 while an interval being maintained, as illustrated in FIG. 3 and FIG. 4. Light emitted from the light-emitting surfaces 172a mainly enters the extended portion 192 of the light guide member 19 from the plate surface (second light-incident surface) 192b.

In the liquid crystal display apparatus 10 that has a configuration described above, the first LEDs 171 and second LEDs 172 of the illumination device 12 emit light when an image is displayed on the display surface 11a of the liquid crystal panel 11. Light from the first LEDs 171 mainly enters the light-guide main portion 191 from the light-incident surface (first light-incident surface) 191c. Light entering the light guide member 19 (light-guide main portion 191) from the light-incident surface 191c advances in the light-guide main portion 191 while being reflected by the light-reflecting/scattering pattern, reflecting sheet 20, and so forth, provided on the plate surface 19b on the rear side of the light guide member 19, and is emitted from the light-emitting surface 191a as light spreading in a planar manner.

Also, light from the second LEDs 172 enters the extended portion 192 from the plate surface (second light-incident surface) 192b on the rear side of the extended portion 192.

Light entering the extended portion 192 travels from the extended portion 192 to the light-guide main portion 191 side, while, for example, being reflected at the frame 16 (main frame portion 161) covering the front side of the extended portion 192, the surface 18a of the LED board 18, and so forth. Light L21 that travels to the light-guide main portion 191 side is mainly emitted from the corner portions aa1 and aa2 of the region aa that correspond to the display region AA in the light-emitting surface 191a.

Of the light-emitting surface 191a of the light guide member 19, the corner portions aa1 and aa2 of the region aa corresponding to the display region AA are portions where the quantity of light tends to be insufficient if light is supplied from the first LEDs 171 alone, as described above. Supplying light from the second LEDs 172 to such portions makes the luminance distribution of light emitted from the light-emitting surface 191a (particularly, the luminance distribution of light emitted from the region aa corresponding to the display region AA) to be uniform. Light emitted from the light-emitting surface 191a in this way is transmitted through the optical sheet 15 and becomes light spreading in a planar manner even more uniformly, and illuminates the rear surface 11b of the liquid crystal panel 11. Consequently, the liquid crystal panel 11 can use the light from the illumination device 12 to cause an image to be displayed on the display surface 11a.

Also, in the illumination device 12 according to the present embodiment, the second LEDs 172 are aligned in one row along with the first LEDs 171 making up the light source row 170. Accordingly, the second LEDs 172 are not arranged so as to extend toward the light-emitting surface 191a side, and the area size of the portion (region aa) on the light-emitting surface 191a of the light guide member 19 corresponding to the display region AA of the liquid crystal panel 11 can be set to be large. Consequently, narrowing of the portion (region naa) corresponding to the non-display region can also be realized.

Also, the second LEDs 172 is controlled to be driven and lit independently from the first LEDs 171 being driven and lit. Specifically, driving power (current) is supplied to the first LEDs 171 via a driver (first supply means) 25a on the LED drive board 25, for the first LEDs 171 to be driven and lit, and also driving power (current) is supplied to the second LEDs 172 via another driver (second supply means) 25b on the LED drive board 25, for the second LEDs 172 to be driven and lit. Accordingly, the luminance of the second LEDs 172 can be independently set to be lower than the luminance of the first LEDs 171, thereby preventing the luminance of the second LEDs 172 becoming excessively high or the like, for example.

Comparative Example 1

Figure 5:
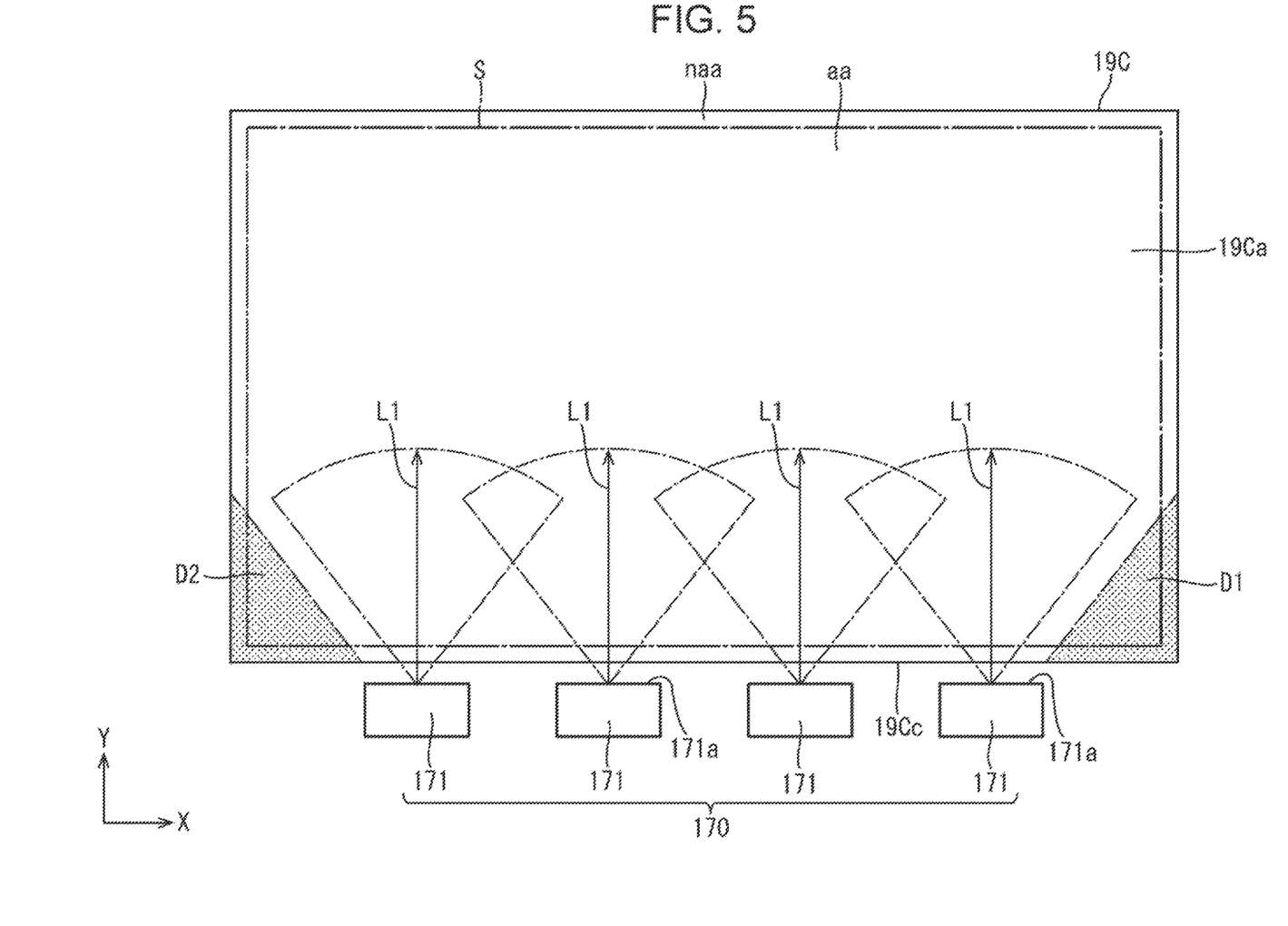
FIG. 5 is a plan view illustrating an arrangement relationship between a light guide plate and LEDs (first LEDs) included in an illumination device according to Comparative Example 1.

A comparative example of the illumination device 12 according to the present embodiment will be described with reference to FIG. 5. FIG. 5 is a plan view illustrating an arrangement relationship between a light guide plate 19C and LEDs (first LEDs 171) included in an illumination device according to Comparative Example 1. The illumination device according to Comparative Example 1 uses only first LEDs 171 as LEDs, and is not provided with second LEDs 172. The light guide plate 19C of a size equivalent to the light-guide main portion 191 with no extended portion 192 formed is used in Comparative Example 1 instead of the light guide member 19 according to Embodiment 1. Of a light-emitting surface 19Ca made up of the plate surface on the front side of the light guide plate 19C, a region within a rectangular frame indicated by the dash-dotted line S is a region aa corresponding to the display region of the liquid crystal panel (region overlapping the display region in plan view), and a region outside the rectangular frame is a region naa corresponding to the non-display region of the liquid crystal panel (region overlapping the non-display region in plan view), in the same way as in Embodiment 1.

In Comparative Example 1, dark portions D1 and D2 that have lower luminance than the surroundings are formed outside of the first LEDs 171 disposed at both ends of the first LEDs 171 making up the light source row 170. Light emitted from the first LEDs 171 disposed at both ends has a predetermined spread angle, as illustrated in FIG. 5, and it is difficult to supply light further outward beyond the spread angle. Accordingly, the dark portions D1 and D2 such as described above are formed.

Figure 6:
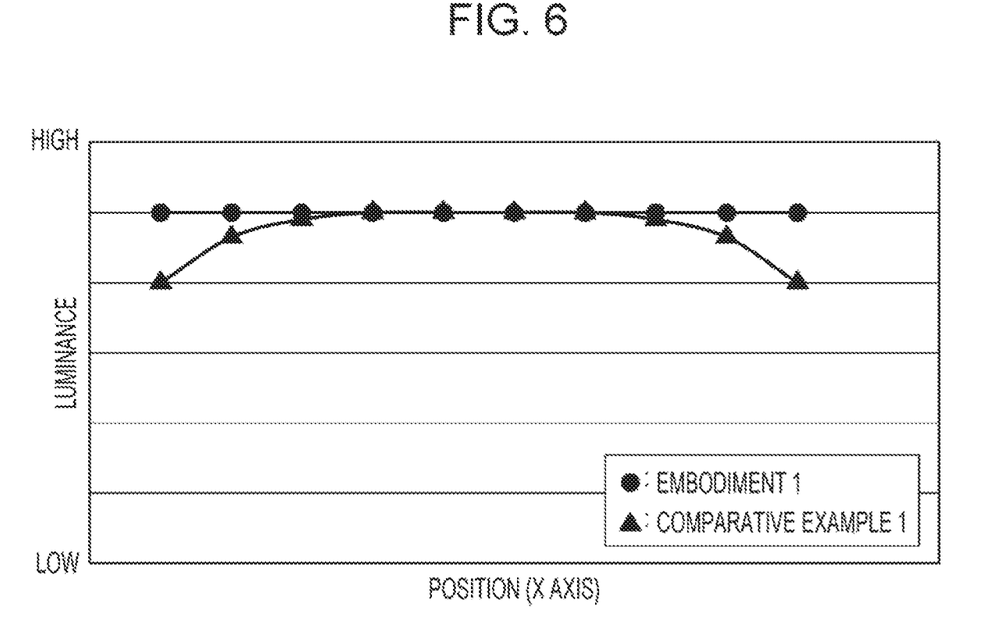
FIG. 6 is a graph illustrating luminance of the illumination device according to Embodiment 1 and luminance of the illumination device according to Comparative Example 1.

FIG. 6 is a graph illustrating luminance of the illumination device 12 according to Embodiment 1 and luminance of the illumination device according to Comparative Example 1. The horizontal axis in the graph in FIG. 6 represents positions at the light-emitting surfaces 191a and 19Ca near the light-incident surfaces 191c and 19Cc of the light guide member 19 and light guide plate 19C in the direction of the long side (X axis direction), and the vertical axis represents the luminance at these positions. The luminance of the light-emitting surface 191a near the light-incident surface 191c of the light guide member 19 is uniform over the direction of the long side (X axis direction) in the illumination device 12 according to Embodiment 1, as illustrated in FIG. 6. In contrast, the luminance at both outer sides of the light source row 170 is low as compared to the middle side in the illumination device according to Comparative Example 1.

Embodiment 2

Figure 7:
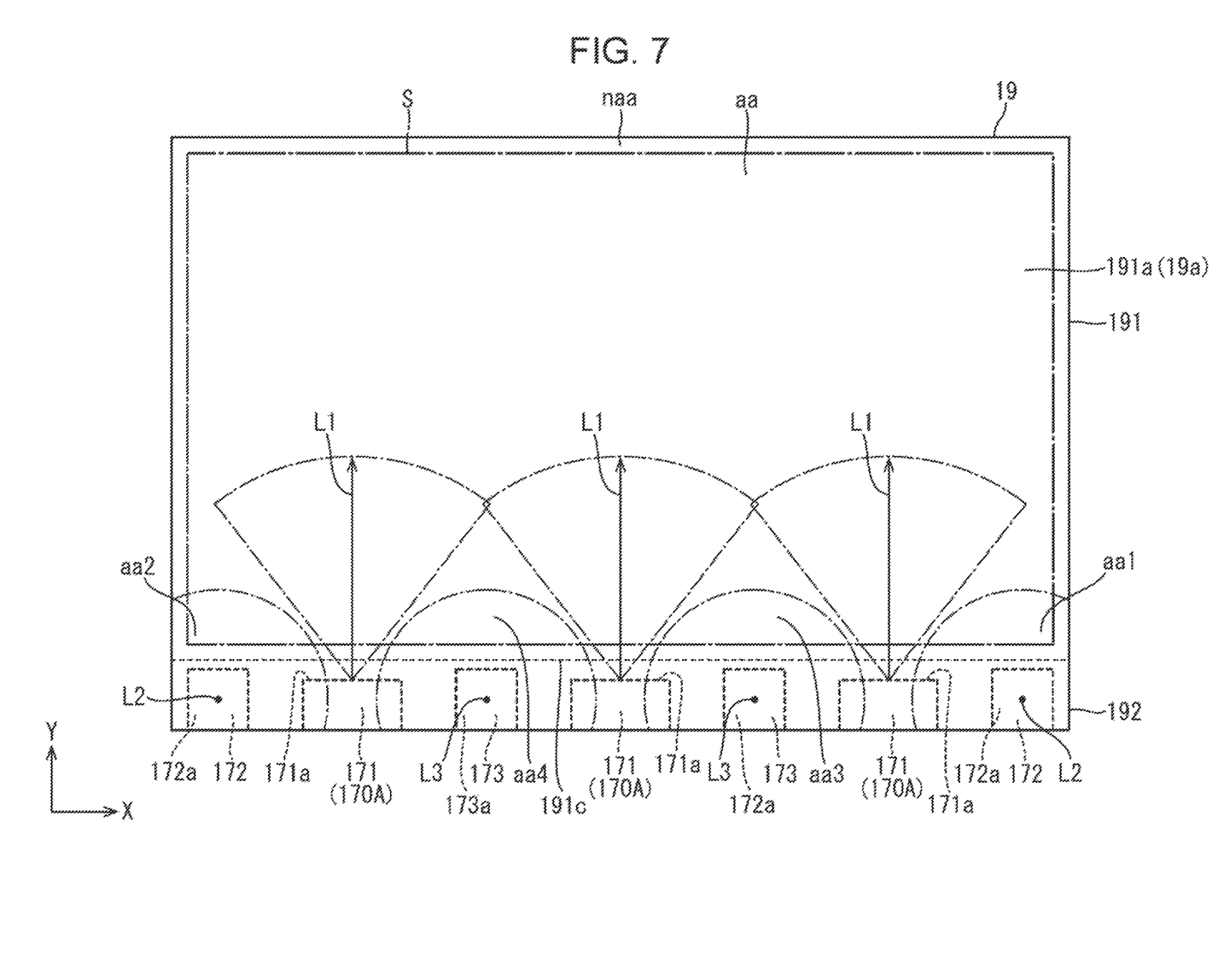
FIG. 7 is a plan view illustrating an arrangement relationship between the light guide member and LEDs (first LEDs, second LEDs, and third LEDs) included in an illumination device according to Embodiment 2.

Next, an illumination device according to Embodiment 2 of the present invention will be described with reference to FIG. 7. In the illumination device according to the present embodiment, the types of LEDs used and the arrangement thereof differ from Embodiment 1. FIG. 7 is a plan view illustrating an arrangement relationship between the light guide member 19 and LEDs (first LEDs 171, second LEDs 172, and third LEDs 173) included in the illumination device according to Embodiment 2. Note that although the illumination device according to Embodiment 2 differs from Embodiment 1 with regard to the arrangement locations of the various types of LEDs and so forth, otherwise, the basic configuration is similar to Embodiment 1 above. The light guide member 19 used in the present embodiment is the same as in Embodiment 1, and has the light-guide main portion 191 and extended portion 192, as illustrated in FIG. 7. Multiple first LEDs 171 are aligned in a row to form a light source row 170A in the same way as in Embodiment 1, but the count of the first LEDs 171 making up the light source row 170A is smaller than in Embodiment 1, and the intervals between adjacent first LEDs 171 are set to be wider. Also, the second LEDs (second light sources) 172 that emit light toward the extended portion 192 are arranged at both ends of the light source row 170A, in the sane way as in Embodiment 1 above. The second LEDs 172 according to the present embodiment also supply light to corner portions (corner portions near the light-incident surface 191c) aa1 and aa2 where the quantity of light tends to be insufficient with the first LEDs 171 alone in the region aa of the light guide member 19 (light-emitting surface 191a) corresponding to the display region of the liquid crystal panel, in the same way as in Embodiment 1.

The intervals between adjacent first LEDs 171 making up the light source row 170A according to the present embodiment are set to be wide, as described above, and accordingly there is almost no direct overlapping of light emitted from the light-emitting surfaces 171a (light having a predetermined spread angle, depicted in a fan-like manner in plan view). Accordingly, light emitted from the light-emitting surfaces (first light-emitting portions) 171a of the first LEDs 171 enters the light guide member 19 from the light-incident surface 191c of the light guide member 19, but the situation is such that direct incidence of light from the first LEDs 171 is difficult at portions of the light-incident surface 191c between adjacent first LEDs 171. Thus, light is not readily emitted from the light-emitting surface 191a near positions between adjacent first LEDs 171, where luminance tends to be lower than the surroundings. Accordingly, in the present embodiment, third LEDs (third light sources) 173 that differ from the first LEDs 171 are disposed between adjacent first LEDs 171, where light from such first LEDs 171 is not readily supplied. The basic configuration of the third LEDs 173 is the same as the second LEDs 172, and light-emitting surfaces (third light-emitting portions) 173a thereof face the plate surface on the rear side of the extended portion 192 in the same way as the light-emitting surfaces (second light-emitting portions) 172a of the second LEDs 172. Note that the optical axis of light emitted from the third LEDs 173 is denoted by symbol L3 in FIG. 7.

The second LEDs 172 is controlled to be driven and lit, and the third LEDs 173 is controlled to be driven and lit, independently from the first LEDs 171 being driven and lit. Specifically, driving power (current) is supplied to the first LEDs 171 via a driver (first supply means) mounted on an LED drive board, for the first LEDs 171 to be driven and lit, and also driving power (current) is supplied to the second LEDs 172 and third LEDs 173 via another driver (second supply means) on the LED drive board, for the second LEDs 172 and third LEDs 173 to be driven and lit. Accordingly, the luminance of the second LEDs 172 and luminance of the third LEDs 173 can be independently set to be lower than the luminance of the first LEDs 171, thereby preventing the luminance of the second LEDs 172 and luminance of the third LEDs 173 becoming excessively high or the like, for example. Also, in another embodiment, the second LEDs 172 being driven to be lit and the third LEDs 173 being driven to be lit may be performed independently from each other so that luminance can be adjusted separately for each.

Of the light-emitting surface 191a of the light guide member 19, the corner portions aa1 and aa2 of the region aa corresponding to the display region of the liquid crystal panel (region within the rectangular frame indicated by the dash-dotted line S) are portions where the quantity of light tends to be insufficient if light is supplied only from the first LEDs 171, in the same way as in Embodiment 1, and light is supplied from the second LEDs 172 to such portions in the same way as in Embodiment 1. Also, of the light-emitting surface 191a of the light guide member 19, edge portions aa3 and aa4 of the region aa near positions between adjacent first LEDs 171 are also portions where the quantity of light tends to be insufficient if light is supplied only from the first LEDs 171 and second LEDs 172. Light from the third LEDs 173 is supplied to such portions in the case of the present embodiment. Thus, in the present embodiment, light is supplied to each of the corner portions aa1 and aa2 and the edge portions aa3 and aa4 of the light-emitting surface 191a where luminance tends to be lower than the surroundings. Accordingly, this makes the luminance distribution of light emitted from the overall light-emitting surface 191a (particularly, the luminance distribution of light emitted from the region aa corresponding to the display region of the liquid crystal panel) to be uniform. Light emitted from the light-emitting surface 191a in this way is transmitted through the optical sheet and becomes light spreading in a planar manner even more uniformly, and enters the liquid crystal panel, in the same way as in Embodiment 1.

Also, in the illumination device according to the present embodiment, the second LEDs 172 and third LEDs 173 are aligned in one row along with the first LEDs 171 making up the light source row 170A. Accordingly, the second LEDs 172 and third LEDs 173 are not arranged so as to extend toward the light-emitting surface 191a side, and the area size of the portion (region aa) on the light-emitting surface 191a of the light guide member 19 corresponding to the display region of the liquid crystal panel can be set to be large. Consequently, narrowing of the portion (region naa) corresponding to the non-display region can also be realized.

Comparative Example 2

Figure 8:
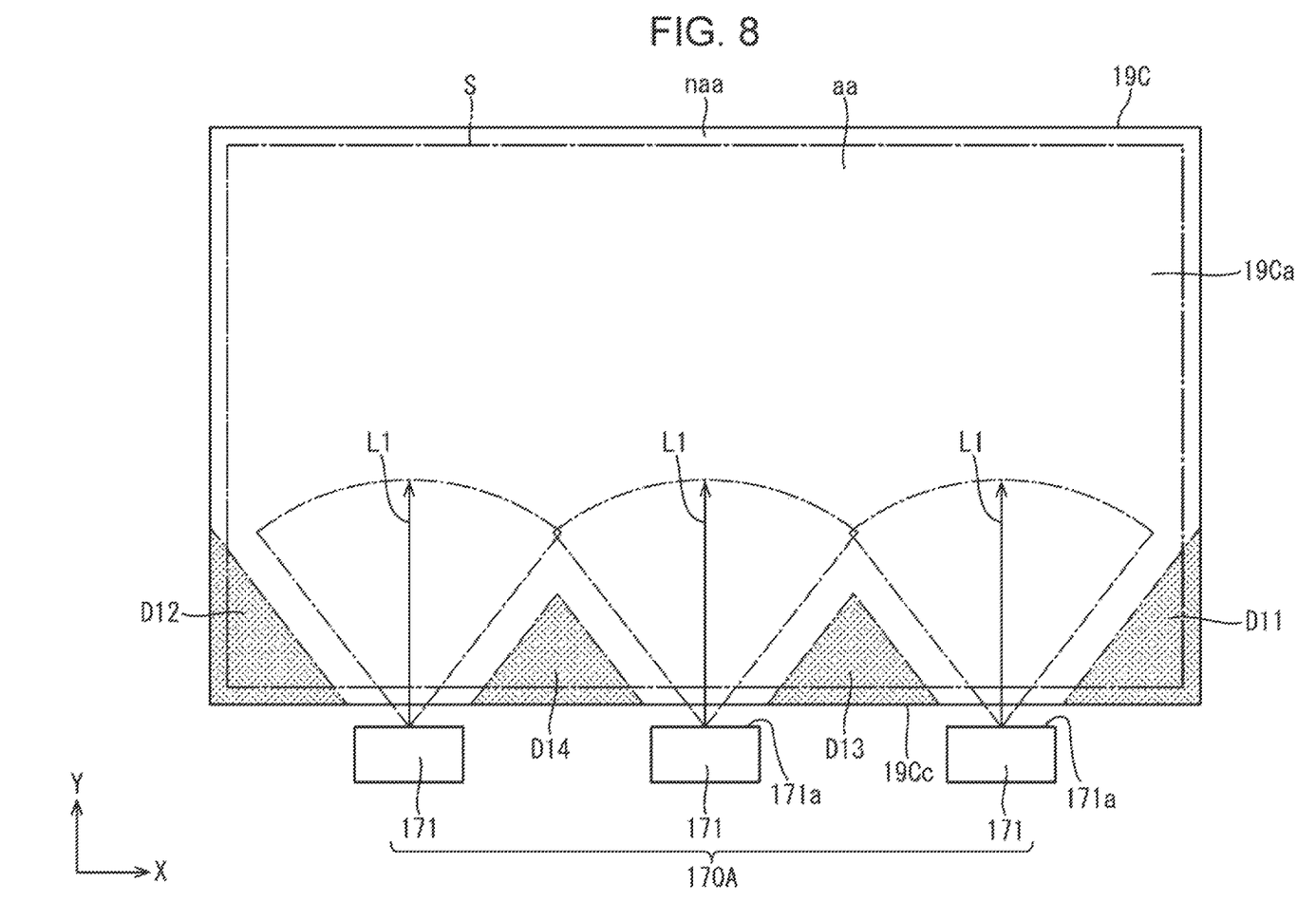
FIG. 8 is a plan view illustrating an arrangement relationship between a light guide plate and LEDs (first LEDs) included in an illumination device according to Comparative Example 2.

A comparative example of the illumination device according to Embodiment 2 will be described with reference to FIG. 8. FIG. 8 is a plan view illustrating an arrangement relationship between the light guide plate 19C and LEDs (first LEDs 171) included in an illumination device according to Comparative Example 2. The illumination device according to Comparative Example 2 uses only first LEDs 171 as LEDs, and is not provided with the second LEDs 172 and third LEDs 173. The light guide plate 19C that is similar to that in the above Comparative Example 1 is also used in the Comparative Example 2. Also, of the light-emitting surface 19Ca made up of the plate surface on the front side of the light guide plate 19C, the region within the rectangular frame indicated by the dash-dotted line S is the region aa corresponding to the display region of the liquid crystal panel (region overlapping the display region in plan view), and the region outside the rectangular frame is the region naa corresponding to the non-display region of the liquid crystal panel (region overlapping the non-display region in plan view) in FIG. 8.

Also, in Comparative Example 2, intervals between adjacent first LEDs 171 are set to be wide, in the same way as in Embodiment 2. Dark portions D11 and D12 that have lower luminance than the surroundings are formed outside of the first LEDs 171 disposed at both ends in Comparative Example 2 configured thus. Light emitted from the first LEDs 171 disposed at both ends has a predetermined spread angle, and it is difficult to supply light further outward beyond the spread angle. Accordingly, the dark portions D11 and D12 such as described above are formed.

Also, of the light-emitting surface 19Ca of the light guide plate 19C, dark portions D13 and D14 that have lower luminance than the surroundings are formed at the edge portions aa3 and aa4 of the region aa near positions between adjacent first LEDs 171. Accordingly, the situation is such that incidence of light from the first LEDs 171 is difficult at portions of the light-incident surface 19Cc between adjacent first LEDs 171, whereby the dark portions D13 and D14 such as described above are formed.

Figure 9:
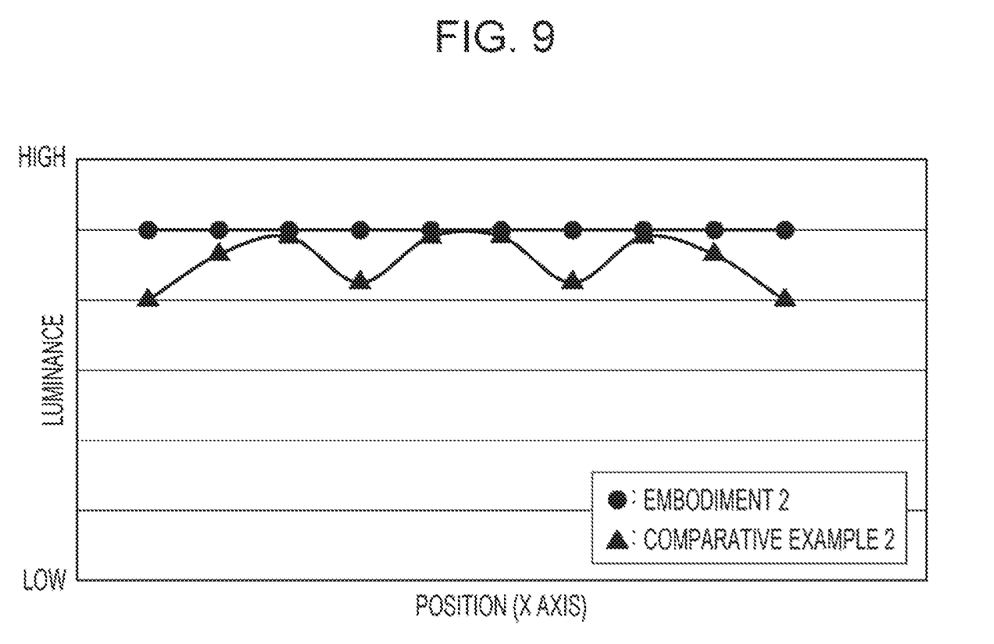
FIG. 9 is a graph illustrating luminance of the illumination device according to Embodiment 2 and luminance of the illumination device according to Comparative Example 2.

FIG. 9 is a graph illustrating luminance of the illumination device according to Embodiment 2 and luminance of the illumination device according to Comparative Example 2. The horizontal axis in the graph in FIG. 9 represents positions at the light-emitting surfaces 191a and 19Ca near the light-incident surfaces 191c and 19Cc of the light guide member 19 and light guide plate 19C in the direction of the long side (X axis direction), and the vertical axis represents the luminance at these positions. The luminance of the light-emitting surface 191a near the light-incident surface 191c of the light guide member 19 is uniform over the direction of the long side (X axis direction) in the illumination device according to Embodiment 2, as illustrated in FIG. 9. In contrast, the luminance at both outer sides of the light source row 170A and the luminance near positions between adjacent first LEDs 171 is low as compared to luminance near the light-emitting surfaces 171a of the first LEDs 171 in the illumination device according to Comparative Example 2.

Embodiment 3

Figure 10:
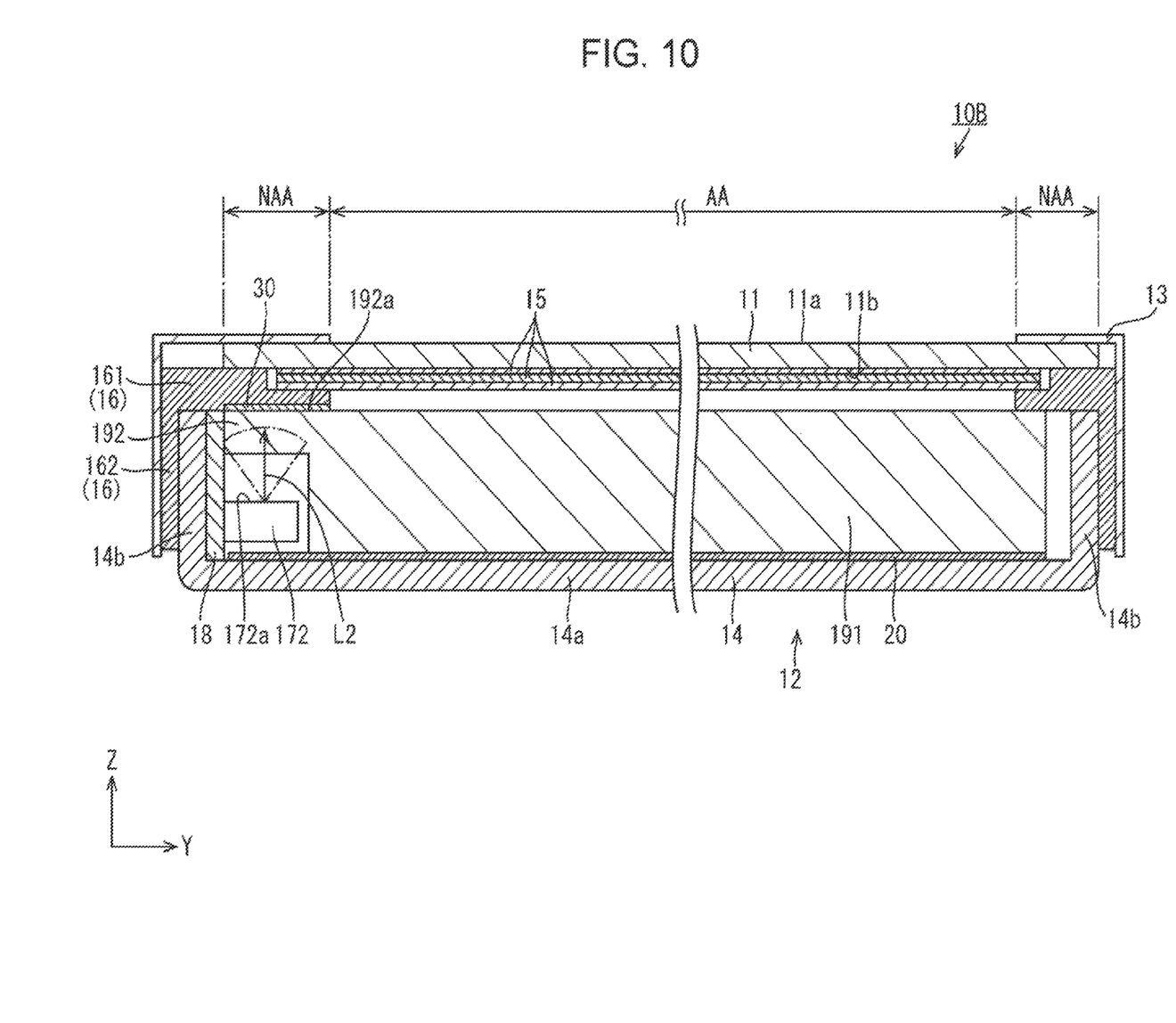
FIG. 10 is a sectional view of a liquid crystal display apparatus according to Embodiment 3.

Next, a liquid crystal display apparatus 10B according to Embodiment 3 will be described with reference to FIG. 10. FIG. 10 is a sectional view of the liquid crystal display apparatus 10B according to Embodiment 3. The liquid crystal display apparatus 10B according to the present embodiment includes a sheet-like light-reflecting member 30 interposed between the plate surface 192a on the front side of the extended portion 192 and the main frame portion 161 of the frame 16 so that the sheet-like light-reflecting member 30 overlaps the second LEDs 172 in plan view. Although the main frame portion 161 itself of the frame 16 has functions of reflecting light from the second LEDs 172 emitted from the extended portion 192 in Embodiment 1, a configuration may be made where the light-reflecting member 30 is provided as a separate member from the frame 16 as in the present embodiment. A sheet-like member having light reflectivity, usable as the reflecting sheet 20 or the like, for example, is used for the light-reflecting member 30. Using such a light-reflecting member 30 enables light supplied from the second LEDs 172 to the extended portion 192 of the light guide member 19 to be effectively utilized.

Other Embodiments

The present invention is not restricted to the embodiments described above and described by way of the drawings, and embodiments such as the following, for example, are also encompassed by the technical scope of the present invention.

(1) In the above Embodiment 1 and so forth, driving and lighting control is performed independently for the first LEDs 171 and the second LEDs 172. However, in other embodiments, driving and lighting control may be performed together (collectively) for the first LEDs 171 and the second LEDs 172, insofar as this does not impair the object of the present invention. Nevertheless, driving and lighting control for the first LEDs 171 and driving and lighting control for the second LEDs 172 and third LEDs 173 are preferably performed independently from each other, as in the above Embodiment 1 and so forth, due to reasons such as ease in making uniform the luminance distribution of light emitted from the illumination device, and so forth.

(2) In the above Embodiment 1 and so forth, the light-emitting surface 191a has a rectangular shape in plan view. However, the light-emitting surface 191a (region aa corresponding to display region AA) may have a shape other than a rectangular shape, insofar as this does not impair the object of the present invention.

(3) An illumination device having a rectangular shape that is laterally long in plan view has been exemplified in the above-described embodiments. However, illumination devices having other shapes may be made, such as an illumination device having a rectangular shape that is longitudinally long in plan view or the like for example, insofar as this does not impair the object of the present invention.

(4) In other embodiments, the display apparatus (liquid crystal display apparatus) may be a television receiver that has a tuner or the like, or may be digital signage or the like.

REFERENCE SIGNS LIST 10 display apparatus, 12 illumination device, 13 bezel, 14 chassis, 15 optical sheet, 16 frame, 170 light source row, 171 first light sources (first LEDs), 171a first light-emitting portion (light-emitting surface), 172 second light sources (second LEDs), 172a second light-emitting portion (light-emitting surface), 173 third light sources (third LEDs), 173a third light-emitting portion (light-emitting surface), 18 LED board (light source board), 19 light guide member, 191 light-guide main portion, 191a light-emitting surface, 191c light-incident surface (first light-incident surface), 192 extended portion, 192b light-incident surface (second light-incident surface), 20 reflecting sheet, AA display region, NAA non-display region, aa region of light-emitting surface overlapping display region in plan view, naa region of light-emitting surface overlapping non-display region in plan view

The invention claimed is:

1. An illumination device, comprising:
a light source row made up of a plurality of first light sources, each of which has a first light-emitting portion that emits light in an identical direction and which is aligned in a row with intervals maintained between the plurality of first light sources;
a light guide member having a light-guide main portion in a plate shape including a light-incident surface which is an end surface facing the first light-emitting portion and on which light from the first light-emitting portion is incident and a light-emitting surface which is a plate surface on a front side and from which light entering the light-guide main portion from the light-incident surface is externally emitted, and having an extended portion in a plate shape which is thinner in thickness than the light-guide main portion and extends toward an outer side from part of the end surface of the light-guide main portion to cover the light source row from the front side; and
a plurality of second light sources, each of which has a second light-emitting portion that emits light toward the extended portion and which is disposed in the row along with the light source row at both ends of the light source row to be covered by the extended portion.

2. The illumination device according to claim 1, further comprising:
one or more third light sources each of which has a third light-emitting portion that emits light toward the extended portion and is disposed between the first light sources adjacent to each other forming the light source row.

3. The illumination device according to claim 1, further comprising:
a first supply means supplying driving power to the first light sources; and a second supply means supplying driving power to the second light sources such that the second light sources are driven to be lit independently from the first light sources.

4. The illumination device according to claim 2, further comprising:
   a first supply means supplying driving power to the first light sources; and
   a third supply means supplying driving power to the second light sources and/or the third light sources such that the second light sources and/or the third light sources are driven to be lit independently from the first light sources.

5. The illumination device according to claim 1, further comprising:
   a light-reflecting member having light reflectivity and being disposed at a portion of a surface on the front side of the extended portion, the portion overlapping at least the second light-emitting portions in plan view.

6. A display apparatus, comprising:
   the illumination device according to claim 1; and
   a display panel that displays an image using light radiated from the illumination device.

\* \* \* \* \*